United States Patent
Cooley

(10) Patent No.: US 12,082,542 B2
(45) Date of Patent: Sep. 10, 2024

(54) PLANT-GROWING TRAY

(71) Applicant: International Plant Propagation Technology Ltd, Skipton (GB)

(72) Inventor: John Cooley, Skipton (GB)

(73) Assignee: International Plant Propagation Technology, LTD (GB)

( * ) Notice: Subject to any disclaimer, the term of this patent is extended or adjusted under 35 U.S.C. 154(b) by 33 days.

(21) Appl. No.: 18/106,326

(22) Filed: Feb. 6, 2023

(65) Prior Publication Data

US 2023/0255147 A1    Aug. 17, 2023

Related U.S. Application Data

(63) Continuation-in-part of application No. 29/847,701, filed on Jul. 27, 2022, and a continuation-in-part of application No. 29/847,743, filed on Jul. 27, 2022, and a continuation-in-part of application No. 29/847,707, filed on Jul. 27, 2022, and a
(Continued)

(51) Int. Cl.
*A01G 9/02*        (2018.01)
*A01G 9/029*       (2018.01)

(52) U.S. Cl.
CPC .............. *A01G 9/028* (2013.01); *A01G 9/027* (2013.01); *A01G 9/0293* (2018.02); *A01G 9/0295* (2018.02)

(58) Field of Classification Search
CPC ........ A01G 9/028; A01G 9/0295; A01G 9/00; A01G 9/02; A01G 9/027
See application file for complete search history.

(56) References Cited

U.S. PATENT DOCUMENTS

| 7,954,277 B2 * | 6/2011 | Cooley | A01G 9/021 47/65.5 |
| D930,500 S * | 9/2021 | Cooley | D11/155 |

FOREIGN PATENT DOCUMENTS

| CA | 2279010 A1 * | 1/2000 | ........... A01G 9/0295 |
| CN | 213073703 U | 4/2021 | |

(Continued)

OTHER PUBLICATIONS

Search Report GB2203058.9; Date of Search Aug. 23, 2022.

*Primary Examiner* — Kristen C Hayes
(74) *Attorney, Agent, or Firm* — Thomas Horstemeyer, LLP

(57) ABSTRACT

A plant-growing tray comprises a plurality of cells, each cell for containing in use a substrate for a plant or a cylindrical stabilised medium for propagating a plant. Each cell is formed from injection-moulded plastic and comprises a cell base and eight inclined side walls extending upwardly from the cell base, and each cell comprises four corner side walls having a corner wall gradient, and four stepped side walls which comprise an upper portion having an upper gradient, a lower portion having a lower gradient, and a step having a step gradient. The step is positioned between the upper portion and the lower portion, and the step gradient is less steep than the gradients of the upper portion and the lower portion of the side wall. Each cell comprises a pair of ribs on each of the four stepped walls, the ribs extending upwards from the cell base. At least a lower portion of the ribs have a rib gradient which is steeper than the gradients of the inclined side walls, and the gradient of the corner side walls is less steep than the upper portion or the lower portion of the stepped walls.

20 Claims, 7 Drawing Sheets

Related U.S. Application Data continuation-in-part of application No. 29/847,703, filed on Jul. 27, 2022.

(56)     References Cited

FOREIGN PATENT DOCUMENTS

| | | | |
|---|---|---|---|
| GB | 2578253 A | 4/2020 | |
| KR | 20100042615 A * | 4/2010 | ............ A01G 9/021 |
| KR | 20130085149 A * | 7/2013 | ............ A01G 9/021 |
| NL | 9101110 A * | 1/1993 | ............ A01G 9/104 |
| WO | WO-2006016100 A1 * | 2/2006 | ............ A01G 9/021 |
| WO | 2018002393 A1 | 1/2018 | |
| WO | WO-2021171001 A1 * | 9/2021 | ............ A01G 27/00 |

* cited by examiner

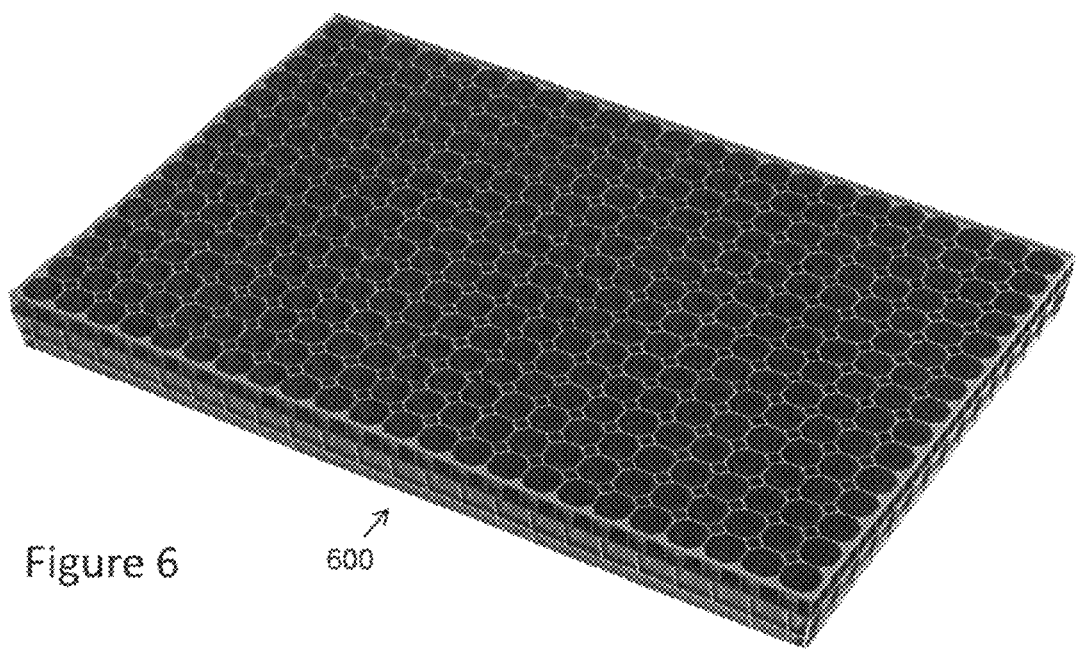
Figure 6    600
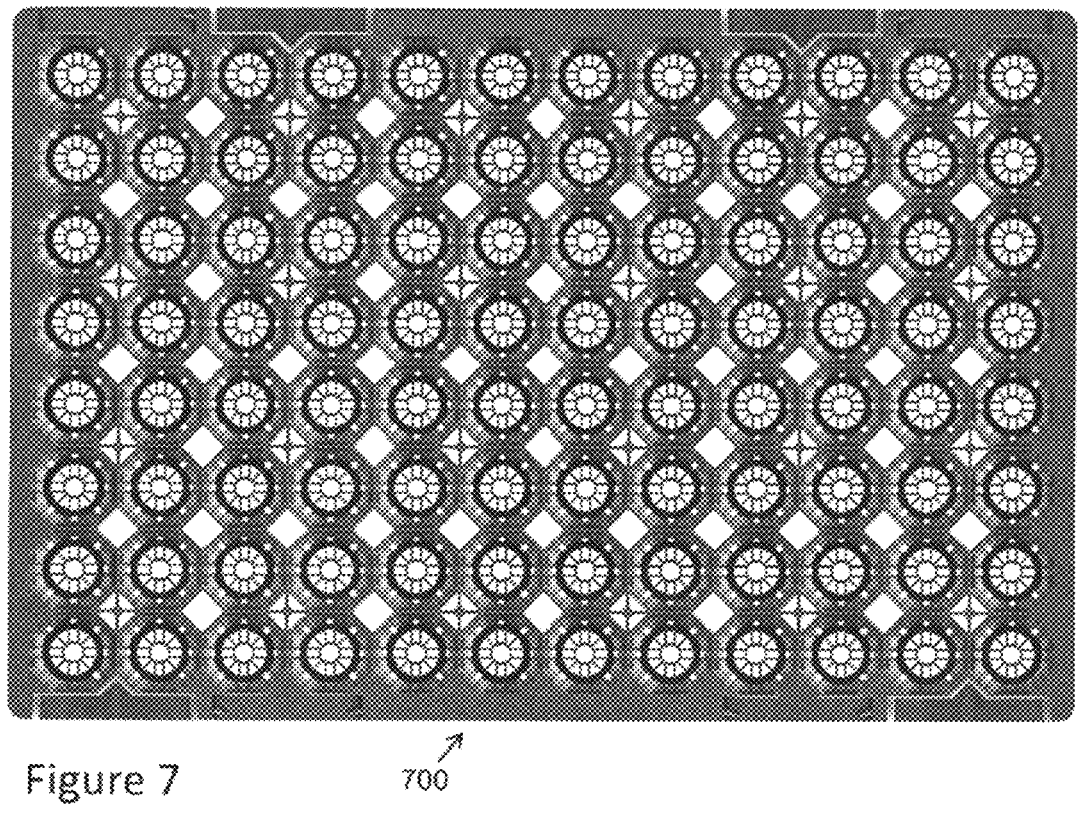
Figure 7    700

PLANT-GROWING TRAY

The invention relates to a plant-growing tray, or frame, and in particular to a plant-growing tray for containing either a substrate or a cylindrical stabilised medium for propagating plants.

CROSS-REFERENCE TO RELATED APPLICATIONS

This application claims priority to, and the benefit of copending United Kingdom Patent Application No. 2203058.9, filed on Mar. 4, 2022, and entitled "PLANT-GROWING TRAY," which is incorporated by reference as if set forth herein in its entirety.

This application is a continuation-in-part of, and claims priority to and the benefit of, copending U.S. Patent Application No. 29/847,703, filed on Jul. 27, 2022, and entitled "PLANT-GROWING CONTAINER," which claims priority to and the benefit of both United Kingdom Design Application No. 6188855, filed on Jan. 27, 2022, and entitled "PLANT-GROWING CONTAINER," and European Community Design Registration No. 008973416-0001, issued on Apr. 22, 2022 and entitled "PLANT-GROWING CONTAINER," each of which is incorporated by reference as if set forth herein in its entirety.

This application is a continuation-in-part of, and claims priority to and the benefit of, copending U.S. Patent Application No. 29/847,707, filed on Jul. 27, 2022, and entitled "PLANT-GROWING CONTAINER," which claims priority to and the benefit of both United Kingdom Design Application No. 6188856, filed on Jan. 27, 2022, and entitled "PLANT-GROWING CONTAINER," and European Community Design Registration No. 008973416-0002, issued on Apr. 22, 2022 and entitled "PLANT-GROWING CONTAINER," each of which is incorporated by reference as if set forth herein in its entirety.

This application is a continuation-in-part of, and claims priority to and the benefit of, copending U.S. Patent Application No. 29/847,743, filed on Jul. 27, 2022, and entitled "PLANT-GROWING CONTAINER," which claims priority to and the benefit of both United Kingdom Design Application No. 6188857, filed on Jan. 27, 2022, and entitled "PLANT-GROWING CONTAINER," and European Community Design Registration No. 008973416-0003, issued on Apr. 22, 2022 and entitled "PLANT-GROWING CONTAINER," each of which is incorporated by reference as if set forth herein in its entirety.

This application is a continuation-in-part of, and claims priority to and the benefit of, copending U.S. Patent Application No. 29/847,701, filed on Jul. 27, 2022, and entitled "PLANT-GROWING TRAY," which claims priority to and the benefit of both United Kingdom Design Application No. 6188858, filed on Jan. 27, 2022, and entitled "PLANT-GROWING TRAY," and European Community Design Registration No. 008973416-0004, issued on Apr. 22, 2022 and entitled "PLANT-GROWING TRAY," each of which is incorporated by reference as if set forth herein in its entirety.

BACKGROUND

In commercial plant-propagation systems, plants may be grown, or propagated, with their roots in any of a number of conventional growing media, or "substrates", such as soil, peat or coir.

When large numbers of plants are to be propagated, they may be arranged in trays, each tray holding a plurality of plants, such as typically between 20 and 800 plants. Trays are typically rectangular. In some cases, the trays are handled by hand and in some cases they are handled by automated machinery. In use, the trays are typically arranged on the ground or on benching or tables.

A tray typically comprises an array of cup-shaped cells, each cell being capable of containing compost for propagation of a plant. Traditionally, cells are filled with loose compost and plant seeds or cuttings. During growth, the plants in the cell develop a system of roots which holds together the compost in a "rootball" or "plug". Well-developed rootballs can be removed from cells all together as a single unit of compost and plant roots, but this only works when enough roots have developed to hold the substrate together.

It is desirable to be able to remove rootballs from cells before the roots have fully developed. For example, the grading of plants is often done when the plants are very young and the rootball has not fully developed. It is also desirable to be able to remove the contents of cells that have not successfully grown a plant. However, this is not possible with loose-filled substrates. A popular way of overcoming this problem is to use stabilised media. Stabilised media for plant propagation typically comprise a substrate contained within some form of material which holds the substrate together while the roots of the plant develop, or substrate mixed with a binder which holds the substrate together. A variety of types of stabilised media are available, including polymer glues which hold the substrate together, and others which contain the substrate in a mesh or other suitable material, such as Jiffy (RTM) plugs.

A particularly popular form of stabilised media is cylindrical, or tubular, stabilised media, such as an Ellepot (RTM), in which a volume of substrate is held in a (typically cylindrical) membrane of a permeable material, such as paper. The membrane is designed to retain the substrate until the plant's root structure is sufficiently developed to retain the substrate itself. Cylindrical stabilised media such as Ellepots (RTM) may be made on site as a continuous extruded tube of soil, which is wrapped in a membrane and cut into individual cylindrical "plugs" of an appropriate length. Cylindrical stabilised media are therefore naturally parallel sided. Each cylindrical plug may be placed upright in the cell of a plant tray ready for plant propagation.

In order to propagate plants in which the development of a good root system is important, it is desirable to be able to propagate plants from cylindrical stabilised media in trays which allow "air pruning" of the developing plant roots. Air pruning occurs by providing apertures or openings in the walls of plant containers, through which roots protrude but are stunted in growth (i.e. pruned) by air. Air pruning thus reduces root circling and promotes a healthy root system.

In the prior art, trays have typically been designed exclusively for use with either loose-filled substrate, or for use with stabilised media. The requirements of the two are typically very different. With loose-filled substrate, tapered cells are used to make the root balls easier to withdraw from the cells when it is time to transplant them, and the cells must contain few enough holes that the loose substrate does not fall out of the holes in the cell. For cylindrical stabilised media, however, tapered cells are undesirable, as the cylindrical stabilised media are intended to stand upright, and tapered walls do not offer enough support, meaning that cylindrical stabilised media often topple over and lean against tapered walls rather than remaining upright in the cells. As the stabilised media do not require the tray walls to hold the substrate together, trays intended for stabilised media typically contain large openings and holes to encourage airflow for aeration and air pruning. This makes these trays unsuitable for containing loose substrate, as the loose substrate would simply fall out of the openings and out of the cells in the tray.

It is an object of the present invention to provide a plant-growing tray that is suitable for use with either loose-filled substrate or cylindrical stabilised media.

SUMMARY OF INVENTION

The invention provides a plant-growing tray as defined in the appended independent claim, to which reference should now be made. Preferred or advantageous features of the invention are set out in dependent sub-claims.

According to a first aspect the invention provides a plant-growing tray comprising a plurality of cells, each cell for containing in use a substrate for a plant or a cylindrical stabilised medium for propagating a plant. Each cell is formed from injection-moulded plastic and comprises a cell base and eight inclined side walls extending upwardly from the cell base. Each cell may comprise four corner side walls having a corner wall gradient. Each cell may also comprise four stepped side walls which comprise an upper portion having an upper gradient, a lower portion having a lower gradient, and a step having a step gradient, the step being positioned between the upper portion and the lower portion. The step gradient is less steep than the gradients of the upper portion and the lower portion of the side wall. Each cell comprises a pair of ribs on each of the four stepped walls, the ribs extending upwards from the cell base. At least a lower portion of the ribs have a rib gradient which is steeper than the gradients of the inclined side walls (the upper gradient, the lower gradient and the corner wall gradient), and the gradient of the corner side walls is less steep than the upper portion or the lower portion of the stepped walls.

The features of the plant-growing tray of the present invention advantageously make the cells suitable for containing either loose substrate (soil, moss, coir, or compost) or a cylindrical stabilised medium.

The term gradient herein is used to refer to the angle of incline, or the steepness, of walls and ribs in the cell.

By providing ribs which have a rib gradient which is steeper than the gradients of the inclined side walls, the cells may advantageously provide support for cylindrical stabilised media while keeping the cell side walls inclined enough to allow extraction of a loose-substrate rootball. When the tray contains cylindrical stabilised media rather than loose-filled substrate, the ribs (or at least a steep lower portion of the ribs) contact the vertical sides of the cylindrical stabilised medium, and support the cylindrical stabilised medium in a vertical orientation in the centre of the cell.

As described further below, the ribs may comprise an upper rib portion with a less steep gradient. However, at least a lower portion of the ribs is preferably steeper than any of the inclined cell side walls, in order to provide reliable support for a cylindrical stabilised medium in an upright position. Preferably the ribs, or at least a lower portion of the ribs, on the stepped walls have a gradient of less than 0.5 degrees from vertical, for example 0.25 degrees from vertical or less.

The step in the stepped side wall provides several advantages which make the cells suitable for containing either loose substrate or a stabilised medium. When using loose substrate for example, the step in the cell side walls may advantageously guide loose fill soil when filling, leading to more even distribution of loose-filled substrate inside the cell. The step in the stepped side wall may also act as a water guide to direct water into the centre of the cell when the plants are watered in use. Instead of water running straight down the cell walls and out of drain holes in the cell base (which can be a particular problem for cylindrical stabilised media, which do not fill the entire cell), the step in the side walls helps to direct water into the cell, either into the middle of the loose-filled substrate, or into the stabilised medium in the centre of the cell.

The use of stepped side walls also widens an upper portion of the cell and increases the cell volume in the upper portion of the cell. This increases the volume of loose-filled substrate which each cell can hold and may advantageously create a root ball shape that is more easily extracted from the cells, and which may be better held together by young roots.

The use of corner side walls that are less steep than the stepped side walls makes the extraction of loose-filled substrate root balls easier. The shallower corner walls provide the benefit of supporting loose-filled substrate at a less-steep angle than that of the stepped side walls. This makes extraction of root balls from the cells easier, as the less-steep corner walls present less friction to the root balls are they are extracted upwards out of the cells.

The step gradient is preferably between 18 and 22 degrees to vertical. The present inventor has found that steps in this angle range advantageously direct water inwards towards the centre of the cell, while not creating such a severe change in wall gradient that the step weakens the structure of the root ball. In a particularly preferred embodiment the step gradient is 20 degrees to vertical.

The step gradient is preferably at least 17.5 degrees less steep (17.5 degrees to vertical more) than the lower portion of the stepped wall.

The steps may preferably have a length (measured in the direction of the incline) of between 3 mm and 7 mm. The present inventors have found that steps of this size in the side walls are sufficient to direct water into the centre of the cell, and to provide a useful increase in the proportion of the cell volume that is located in the upper portion of the cell.

The corner walls preferably have a constant or uniform gradient from the cell base to the top of the cell walls, for example at a tray top.

The corner side walls are arranged between the stepped side-walls, such that each corner side wall is offset from two adjacent stepped side-walls by 45 degrees around the perimeter of the cell.

Each cell may comprise a pair of ribs on each corner side wall, such that the cell comprises four pairs of ribs on the stepped walls, and four pairs of ribs on the corner walls, totalling eight pairs of ribs. The corner ribs preferably do not comprise a step. The corner ribs on the corner walls are preferably configured to act as root-training ribs which prevent root-circling.

Preferably the ribs on the corner side walls have a corner rib gradient that is less steep than the ribs on the stepped walls. The ribs on the corner walls may advantageously have the same gradient as the corner walls. If the corner ribs have a less steep gradient than the ribs on the stepped walls, the corner ribs may not support a cylindrical stabilised medium placed in the centre of the cell. However, the corner ribs may prevent root-circling when the cells are filled with loose substrate.

The corner ribs may comprise a lower portion adjacent to the cell base which has a gradient steeper than the corner walls. The lower portion of the corner ribs may have the same gradient as the lower portions of the ribs on the stepped walls. Preferably the lower portion of the corner ribs on the corner walls have a gradient of less than 0.5 degrees from vertical, for example 0.25 degrees from vertical or less. This lower portion may be configured to contact a cylindrical stabilised medium positioned in the cell, to provide additional support and stabilisation to the base of the cylindrical stabilised medium where it contacts the cell base.

The lower portions of the stepped cell side walls are connected to adjacent corner side walls by curved wall portions. These curved wall portions reduce the number of sharp corners in the cell, and may advantageously provide a smoother supporting surface for loose-filled substrate in the cell, reducing the occluded volume in the cell in which substrate could be trapped when the rootball is withdrawn.

Each cell has eight side walls, comprising four stepped side walls arranged 90 degrees apart around the cell, and four corner side walls arranged between the stepped side walls.

The upper gradient of the stepped side walls is preferably different from the lower gradient of the stepped side walls. Preferably the lower gradient is less steep than the upper gradient. As the lower portion of the ribs is steep enough to support cylindrical stabilised media when they are used, the lower portion of the stepped side walls may advantageously be made less steep, in order to better support loose-filled substrate. In order to allow easier extraction of a loose-filled substrate root ball (which when extracted will be held together only by the root system of the plant), the lower portion of the stepped side walls is made less steep than the upper portion—this may advantageously provide less friction in the lower portion of the cell and allow the lower portion of the root ball to be more easily released from the side walls.

The lower gradient is preferably at least 0.5 degrees less steep than the upper gradient. The upper gradient may optionally be 1 degree or less from vertical, and the lower gradient may be 1 degree or more from vertical. In a first preferred embodiment, the lower gradient is 2 degrees less steep than the upper gradient. In a second preferred embodiment, the lower gradient is 0.5 degrees less steep than the upper gradient.

The angle of the corner walls to vertical may be at least three times greater than the angle to vertical of the upper portion of the stepped walls. The corner walls may thus be significantly less steep than the upper portion of the stepped walls. This may advantageously make extraction of loose-fill root balls easier than it would be if all side walls were as steep as the upper portion of the stepped walls.

Each of the stepped side walls preferably comprises a first opening extending upwards from the cell base, and each cell comprises a plurality of second openings arranged on the corner side walls.

The openings are preferably positioned between rib pairs (with one rib of the pair on one side of the opening, and the other rib of the pair on the other side of the opening), and the width of each opening is preferably equal to the separation between a pair of ribs.

The first openings extend upwards from the cell base over a first opening height, and the second openings extend upwards from the cell base over a second opening height, Particularly preferably the second opening height is at least two times greater than the first opening height. As the cells are configured to work well with either cylindrical stabilised media or loose-filled substrate, the size of the openings is a key consideration to ensure that air pruning of roots takes place, but the openings are not so large that loose-filled substrate does not fall straight out of the cells through the openings.

In a preferred embodiment, each of the first openings is preferably positioned between a pair of ribs, and a rib crossbar extends laterally between the pair of ribs above the first opening. The provision of the rib crossbar above the first openings advantageously helps to direct water into the centre of the cell (into the walls of the cylindrical stabilised medium for example) rather than running downwards out of the first opening and missing the stabilised medium. The rib crossbar thus provides a useful water-saving feature that ensures more of the water poured over the plant-growing tray is soaked up by the substrate or stabilised media in the cells.

The step meets the lower portion of the side wall at a height of at least 50% of the cell height, or at least 60% of the cell height, or at least 70% of the cell height.

Each cell comprises drainage holes in the cell base. The drainage holes serve to allow excess water to drain out of the cells, and also to allow air pruning of roots that grow out of the root ball and down through the drainage holes. The drainage holes preferably occupy between 60% and 70% of the area of the cell base, with the remainder of the cell base being formed by injection moulded plastic. Particularly preferably, the drainage holes occupy between 64% and 66% of the area of the cell base. The present inventor has found that drainage holes having this area relative to the cell base area strike a balance between allowing sufficient drainage and air pruning, and not being so large that loose-filled substrate simply falls out of the cell through the drainage holes.

In some preferred embodiments, the pair of ribs on each stepped wall are stepped ribs. Each stepped wall may comprise a pair of ribs extending inwards into the cell, wherein the ribs on the stepped walls comprise an upper rib portion having an upper rib gradient, a lower rib portion having a lower rib gradient, and a rib step having a rib step gradient, the rib step being positioned between the upper rib portion and the lower rib portion. The rib step gradient is less steep than the upper rib gradient and the lower rib gradient.

In embodiments having stepped ribs, the lower rib portion corresponds to the lower portion of the ribs defined in claim 1. Thus at least the lower rib portion of the stepped ribs have a rib gradient which is steeper than the gradients of the inclined side walls.

The provision of stepped ribs on the stepped side walls gives several technical benefits. As the ribs extend "vertically" up the side walls of the cell, the ribs perform the function of root-training and preventing root circling, in order to encourage a healthy root system in the root ball.

When the cells are used with cylindrical stabilised media, the upper rib portions and the rib steps of the stepped ribs assist with guiding the cylindrical stabilised medium into its intended position in the centre of the cell. As stabilised media are typically placed into plant-growing trays by automated machines, this helps to accommodate any misalignment of the trays with the machines, and to ensure that the stabilised media always end up in an upright position in the centre of the cells. The lower rib portions then perform the function of supporting and stabilising the stabilised medium in its upright position, as discussed above.

The stepped gradients of the ribs also mean that when the cells are used with loose-filled substrate, the ribs do not protrude too far into the substrate. By keeping the upper rib portion of the stepped ribs close to the profile of the stepped side walls, it is ensured that the ribs do not project so far into the substrate that they negatively affect the structural integrity of a loose-filled substrate root ball.

The rib step gradient is preferably the same as the step gradient of the stepped side walls.

The rib step may have a rib step gradient of between 15 and 25 degrees to vertical, preferably between 18 and 22 degrees to vertical, particularly preferably 20 degrees to vertical. The present inventor has found that rib steps with such gradients help to guide cylindrical stabilised media smoothly into an upright central position with the lowest likelihood of the stablilised medium tipping over and failing to drop accurately into position.

In preferred embodiments, the lower rib gradient is steeper than the upper rib gradient and the rib step gradient.

Preferably the lower rib gradient is steeper than the lower gradient of the stepped side wall. Particularly preferably the lower rib gradient is 0.5 degrees to vertical or less, for example 0.5 degrees to vertical or 0.25 degrees to vertical. Such gradients provide the best support to stabilise a cylindrical stabilised medium in an upright position.

The upper rib gradient is preferably the same as the upper gradient of the stepped side wall. This may advantageously allow the upper rib portion to act as root training ribs without protruding too far into loose fill substrate in the cell. Providing the upper rib portion at the same gradient as the upper portion of the stepped side wall also aids in the extraction of a loose-filled substrate root ball, as the ribs project less deeply into the structure of the root ball.

In preferred embodiments, the rib step has a length (along the rib step gradient) of between 10 mm and 12 mm. This size of rib step may advantageously provide a big enough separation between the upper rib portion and the lower rib portion that the lower rib portion can be sufficiently steep (close to vertical) to support a cylindrical stabilised medium upright, while the upper rib portion is sufficiently shallow to avoid weakening the structural integrity of a loose filled substrate root ball.

In particularly preferred embodiments, the plant-growing tray comprises an array of 96 cells, or 126 cells, or 345 cells.

Preferably the tray comprises a tray top formed by the tops of the plurality of cells, and/or a tray skirt around its perimeter.

The skirt preferably extends downwards from the tray top. The skirt is preferably arranged around at least a portion of the tray perimeter.

The height of the skirt is preferably equal to or greater than the height of the cells.

The tray preferably comprises a pair of first legs, positioned on a first side of the tray and having a first separation between the first legs, and a pair of second legs, positioned on a second side of the tray opposite the first side and having a second separation between the second legs. The first separation and the second separation are different.

The first legs comprise a recessed upper portion, the recessed upper portion being configured to receive the first legs of an identical tray stacked on top of the tray in a first stacking orientation. Likewise, the second legs comprise a recessed upper portion, the recessed upper portion being configured to receive the second legs of an identical tray stacked on top of the tray in the first stacking orientation. In the first stacking orientation, the legs of the stacked trays nest within one another, and the tray skirts of the two trays abut one another so that the tray top of the first tray is flush with the bottom of the tray stacked on top.

The second side of the tray top preferably comprises a pair of first recesses, the first recesses being separated by the first separation. The first side of the tray top preferably comprises a pair of second recesses, the second recesses being separated by the second separation. In a second stacking orientation a second tray is rotated by 180 degrees and stacked on top of the tray top, so that the first feet of the second tray are received in the first recesses of the tray top, and the second feet of the second tray are received in the second recesses.

The first and second recesses are configured to be shallower than the height of the legs, so in the second stacking orientation the bottom of the upper tray is raised above the tray top of the tray below. This creates a gap between stacked trays which allows plant stems and leaves to project up into the gap even when the trays are stacked to save space.

A variety of tray dimensions are possible, depending on the plants intended to be grown in the plant-growing trays. In a particularly preferred embodiment, however, the cells and the skirt have a height of 100 mm, and the legs have a height of 80 mm (the legs project downwards 80 mm beyond the bottom of the skirt). The recessed upper portions of the legs have a depth of 80 mm from the tray top, so that in the first stacking orientation the legs of the tray above are received entirely in the recessed upper portions of the tray below. The first and second recesses have a depth of 10 mm, so that in the second stacking orientation, the gap between the tray top and the bottom of the tray above is 70 mm. This provides sufficient space for young plants to extend above the tray top without being crushed by the tray above.

DESCRIPTION OF SPECIFIC EMBODIMENTS

Specific embodiments of the invention will be now be described by way of example, with reference to the accompanying drawings in which:

FIG. 6 is a perspective view of a plant-growing tray according to a preferred embodiment of the present invention;

FIG. 7 is a plan view of a plant-growing tray according to another preferred embodiment of the present invention;

FIGS. 1 and 2 illustrate a first embodiment of plant-growing tray 100 according to the present invention.

Figure 1:
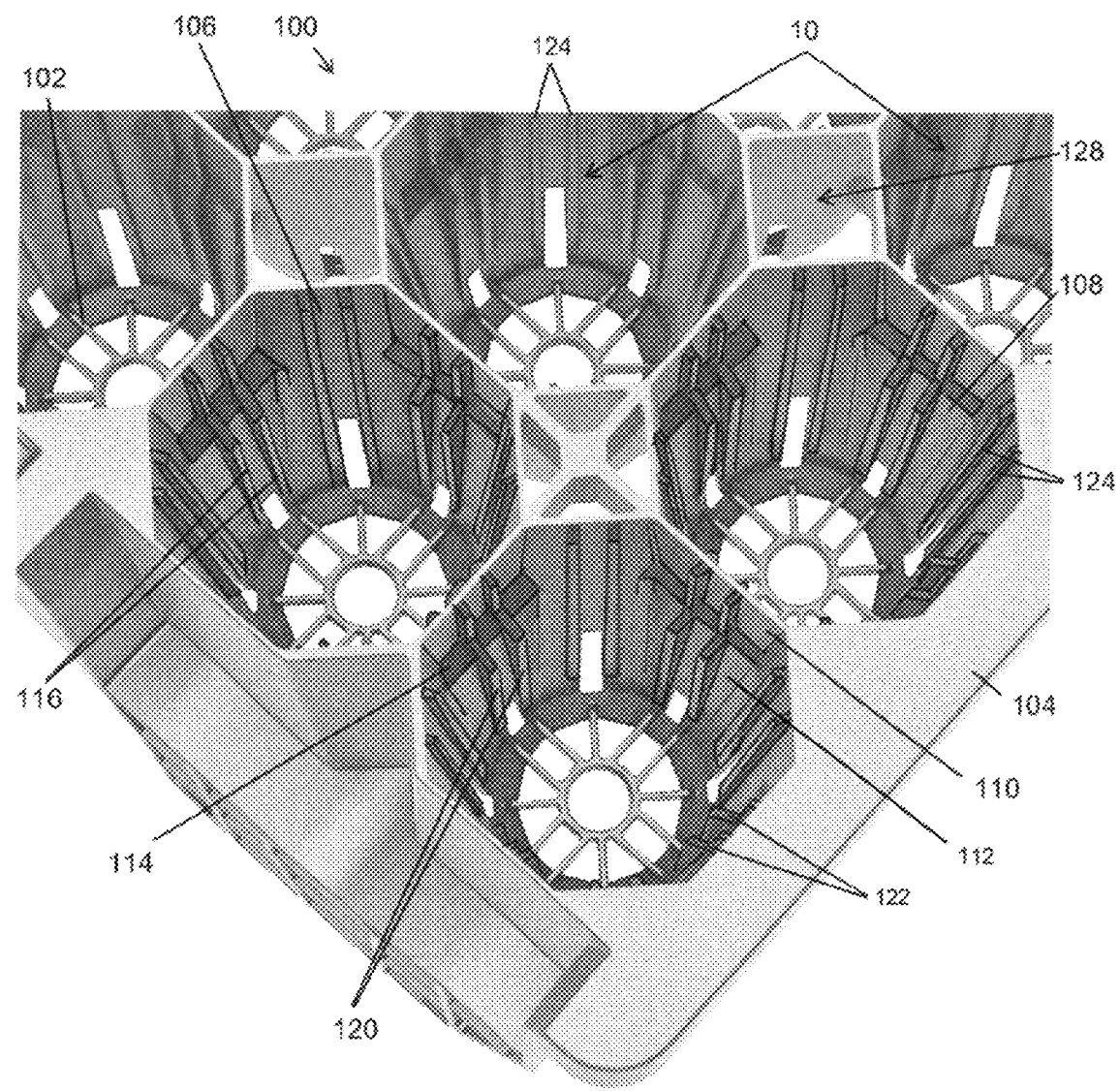
FIG. 1 is a partial perspective view of a plant-growing tray according to a first preferred embodiment of the present invention.

In this embodiment, the plant-growing tray 100 comprising a plurality of cells 10 set out in a regular array. Each cell is configured so that it is suitable for containing in use either a substrate for a plant, or a cylindrical stabilised medium for propagating a plant.

The tray 100 is formed from injection-moulded plastic.

Each cell 10 in the tray comprises a cell base 102 and eight inclined side walls sloping upwardly from the cell base 102 to a tray top 104. Each cell comprises four corner side walls 106, and four stepped side walls 108. The stepped side walls 108 are made up of three sloped sections: an upper portion 110 having an upper gradient, a lower portion 112 having a lower gradient, and a step 114 having a step gradient. The step 114 is positioned between the upper portion 110 and the lower portion 112. The step gradient is less steep than the gradients of the upper portion and the lower portion of the side wall.

A pair of upright ribs 116 extends upwardly from the cell base over each of the four stepped walls 108. Like the stepped walls 108, the ribs 116 are stepped ribs made up of three sloped sections: an upper rib portion 118 having an upper rib gradient, a lower rib portion 120 having a lower rib gradient, and a rib step 122 having a rib step gradient. The rib step gradient is less steep than the upper rib gradient and the lower rib gradient.

The lower rib portion 120 of the stepped ribs 116 have a steeper gradient than any of the inclined side walls, and the gradient of the corner side walls 106 is less steep than the upper portion 110 or the lower portion 112 of the stepped walls 108.

In the illustrated first embodiment, the step gradient of the step 114 is 20 degrees to vertical, and the rib step gradient of the rib step 122 is also 20 degrees to vertical. These angles help to guide cylindrical stabilised media into position in the centre of the cells when they are dropped into the cells by automated cell-filling machines. These angled steps also help to direct water inwards into the cell when the plants are watered.

The lower portion 112 of the stepped side wall has a gradient of 2.5 degrees to vertical, while the lower rib portion has a gradient of 0.25° to vertical—the steepness of the ribs 116 at the lower rib portion 120 means that when a cylindrical stabilised medium is placed in the cell, the lower rib portions abut the vertical sides of the cylindrical stabilised medium, and support it in an upright position. This advantageously prevents the cylindrical stabilised medium from tipping over when the tray is being moved, and ensures that the location of the cylindrical stabilised medium is as reliable as is required for automated extraction processes.

Both the upper portion 110 of the stepped side wall and the upper rib portion 118 of the stepped ribs 116 have a gradient of 0.5 degrees to vertical. The step in the side walls and the ribs increases the relative proportion of the cell volume that is located in the upper portion of the cell compared to the lower portion of the cell. Stepping the ribs 116 out to follow the stepped profile of the side walls allows the ribs to guide-in cylindrical stabilised media when they are dropped in from above the tray. This also gives the upper rib portion 118 a shallow profile, so that when the cells are filled with loose substrate instead of a cylindrical stabilised medium, the upper rib portions 118 do not project so far into the substrate that they negatively affect the structural integrity of the root ball.

The corner side walls 106 have a shallower, less steep, gradient than the stepped side walls 108. In the illustrated embodiment, the corner side walls 106 have a constant gradient of 3.75° from vertical. The less steep incline of the corner side walls helps to make it easier to extract loose-filled substrate root balls from the cells, as they exert less friction on the sides of the root balls as they are urged upwards.

A pair of non-stepped root-training ribs 124 extends upwards from the cell base over each of the corner side walls 106. The gradient of the ribs 124 is 3.75° from vertical, so that the face of the ribs is parallel to the inclined corner side wall. The non-stepped root-training ribs 124 optionally comprise a lower portion adjacent to the cell base at which the gradient changes to 0.25° from vertical, to match the gradient of the lower rib portions of the stepped ribs 116. These lower portions thus act as further points of contact with a cylindrical stabilised medium placed in the cell, to hold the base of the stabilised medium more securely in the centre of the cell.

The tray 100 comprises regular square vents 128 formed between the corner side walls of adjacent cells 10. These vents allow air flow vertically through the tray, which reduces humidity in the canopy.

Four first openings 130 are positioned around the cell base, each first opening being positioned in the separation between a pair of stepped ribs 116. Four second openings 132 are arranged around the cell base at 45 degree offsets from the first openings, such that the second openings 132 are each positioned in the separation between a pair of non-stepped ribs 124 on the corner side walls. Both the first openings 130 and the second openings 132 advantageously provide drainage and aeration to the base of the cell, as well as allowing air pruning to take place when roots grow downwards out of the openings.

The cell base 102 is formed from a plurality of base ribs defining a plurality of drainage holes. The base ribs support the base of a cylindrical stabilised medium or substrate contained in the cells, while the drainage holes allow excess water to escape. In the preferred embodiment illustrated, the drainage holes occupy 66% of the area of the cell base, which allows sufficient drainage while still providing enough support that loose-filled substrate does not fall out of the drainage holes.

The dimensions of the cells 10 may be varied to suit different plants. In a particularly preferred embodiment however the illustrated cells 10 have a cell volume of 140 cc, such that each cell 10 is capable of containing 140 cc of loose-filled substrate. The cells 10 have a depth from cell base to tray top of 100 mm, and the diameter of the cell base between opposing stepped ribs 116 is 35 mm, such that the cells are capable of holding loose filled substrate or receiving a cylindrical stabilised medium with a diameter of 35 mm and a height of 97 mm. The separation between the two stepped ribs 116 in a pair is 3.6 mm at the cell base, enlarging slightly to 4.5 mm at the tray top. The distance between the cell base and the bottom of the step in the stepped side wall is 64 mm in the preferred embodiment, and the step has a length of 7 mm.

Figure 3:
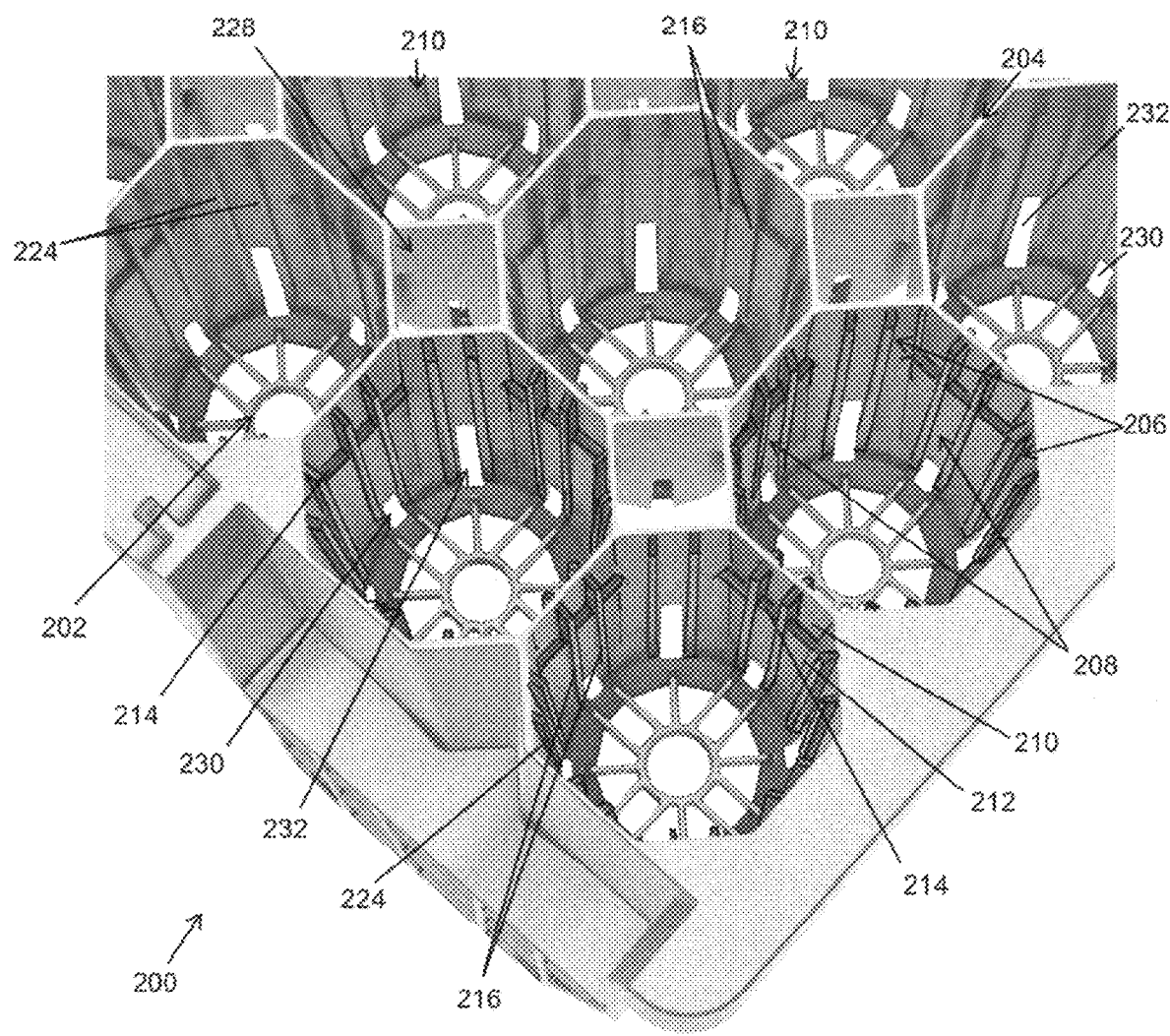
FIG. 3 is a partial perspective view of a plant-growing tray according to a second preferred embodiment of the present invention.

FIG. 3 illustrates a second embodiment of plant-growing tray 200 according to the present invention.

In this embodiment, the plant-growing tray 200 comprising a plurality of cells 210 set out in a regular array. Each cell is configured so that it is suitable for containing in use either a substrate for a plant, or a cylindrical stabilised medium for propagating a plant.

The tray 200 is formed from injection-moulded plastic.

Each cell 210 in the tray comprises a cell base 202 and eight inclined side walls sloping upwardly from the cell base 202 to a tray top 204. Each cell comprises four corner side walls 206, and four stepped side walls 208. The stepped side walls 208 are made up of three sloped sections: an upper portion 210 having an upper gradient, a lower portion 212 having a lower gradient, and a step 214 having a step gradient. The step 214 is positioned between the upper portion 210 and the lower portion 212. The step gradient is less steep than the gradients of the upper portion and the lower portion of the side wall.

A pair of upright ribs 216 extends upwardly from the cell base over each of the four stepped walls 208. Unlike the stepped walls 208, the ribs 216 are not stepped. The ribs 216 on the stepped walls 208 have a constant rib gradient from the cell base up to a chamfered upper section which has a shallower gradient for guiding cylindrical stabilised media into the cell.

The ribs 216 have a steeper gradient than any of the inclined side walls, and the gradient of the corner side walls 206 is less steep than the upper portion 210 or the lower portion 212 of the stepped walls 208.

In the illustrated second embodiment, the step gradient of the step 214 is 20 degrees to vertical. This angle helps to direct water inwards into the cell when the plants are watered.

The lower portion 212 of the stepped side wall has a gradient of 1 degree to vertical, while the ribs 216 have a gradient of 0.25° to vertical—the steepness of the ribs 216 means that when a cylindrical stabilised medium is placed in the cell, the ribs abut the vertical sides of the cylindrical stabilised medium, and support it in an upright position. This advantageously prevents the cylindrical stabilised medium from tipping over when the tray is being moved, and ensures that the location of the cylindrical stabilised medium is as reliable as is required for automated extraction processes.

The upper portion 210 of the stepped side wall has a gradient of 0.5 degrees to vertical. The step in the side walls and the ribs increases the relative proportion of the cell volume that is located in the upper portion of the cell compared to the lower portion of the cell.

The corner side walls 206 have a shallower, less steep, gradient than the stepped side walls 208. In the illustrated embodiment, the corner side walls 106 have a constant gradient of 1.75° from vertical. The less steep incline of the corner side walls helps to make it easier to extract loose-filled substrate root balls from the cells, as they exert less friction on the sides of the root balls as they are urged upwards.

A pair of root-training ribs 224 extends upwards from the cell base over each of the corner side walls 206. The gradient of the ribs 224 is 0.9° from vertical.

The tray 200 comprises square vents 228 formed in the tray top between the corner side walls of adjacent cells 210. These vents allow air flow vertically through the tray, which reduces humidity in the canopy.

Four first openings 230 are positioned around the cell base, each first opening being positioned in the separation between a pair of ribs 216. Four second openings 232 are arranged around the cell base at 45 degree offsets from the first openings, such that the second openings 232 are each positioned in the separation between a pair of ribs 224 on the corner side walls. Both the first openings 230 and the second openings 232 advantageously provide drainage and aeration to the base of the cell, as well as allowing air pruning to take place when roots grow downwards out of the openings.

The first openings 230 extend upwards from the cell base over a height of 13 mm, while the second openings 232 extend upwards from the cell base over a height of 33.5 mm.

The cell base 202 is formed from a plurality of base ribs defining a plurality of drainage holes. The base ribs support the base of a cylindrical stabilised medium or substrate contained in the cells, while the drainage holes allow excess water to escape. In the preferred embodiment illustrated, the drainage holes occupy 66% of the area of the cell base, which allows sufficient drainage while still providing enough support that loose-filled substrate does not fall out of the drainage holes.

The dimensions of the cells 210 may be varied to suit different plants. In a particularly preferred embodiment however the illustrated cells 210 have a cell volume of 105 cc, such that each cell 210 is capable of containing 105 cc of loose-filled substrate. The cells 210 have a depth from cell base to tray top of 90 mm, and the diameter of the cell base is 35 mm, such that the cells are capable of holding loose filled substrate or receiving a cylindrical stabilised medium with a diameter of 35 mm and a height of 90 mm. The ribs 216 have a gradient of 0.25 degrees from vertical for a height of 80 mm from the cell base, above which the ribs 216 are chamfered at a shallower angle. The distance between the cell base and the bottom of the step in the stepped side wall is 58 mm in the preferred embodiment, and the step has a length of 3 mm.

Figure 4:
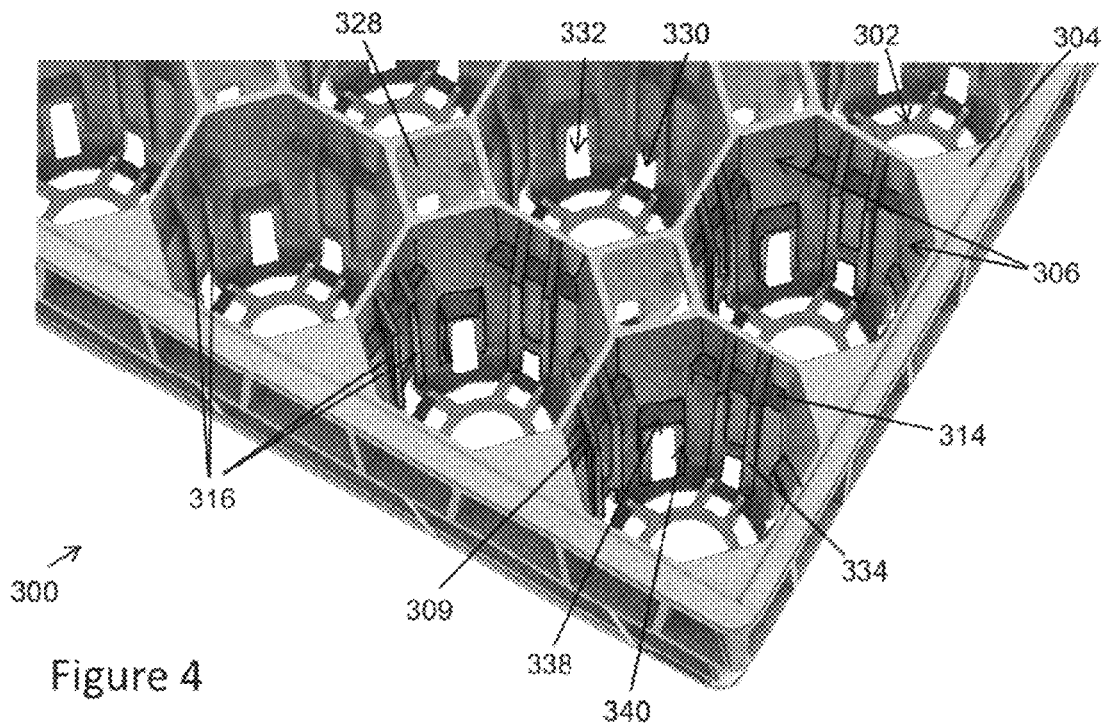
FIG. 4 is a partial perspective view of a plant-growing tray according to a third preferred embodiment of the present invention.
Figure 5:
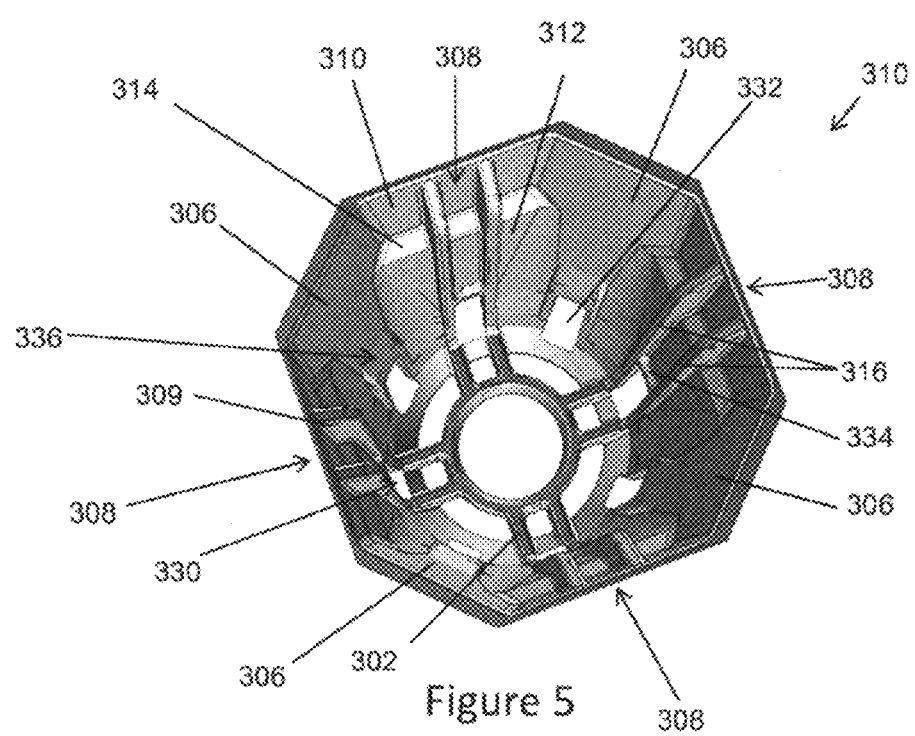
FIG. 5 is a perspective view of a single cell of the plant-growing tray of FIG. 6.

FIGS. 4 & 5 illustrate a third embodiment of plant-growing tray 300 according to the present invention.

In this embodiment, the plant-growing tray 300 comprising a plurality of cells 310 set out in a regular array. Each cell is configured so that it is suitable for containing in use either a substrate for a plant, or a cylindrical stabilised medium for propagating a plant.

The tray 300 is formed from injection-moulded plastic.

Each cell 310 in the tray comprises a cell base 302 and eight inclined side walls sloping upwardly from the cell base 302 to a tray top 304. Each cell comprises four corner side walls 306, and four stepped side walls 308. The stepped side walls 308 are made up of three sloped sections: an upper portion 310 having an upper gradient, a lower portion 312 having a lower gradient, and a step 314 having a step gradient. The step 314 is positioned between the upper portion 310 and the lower portion 312. The step gradient is less steep than the gradients of the upper portion and the lower portion of the side wall.

A pair of upright ribs 316 extends upwardly from the cell base over each of the four stepped walls 308. Unlike the stepped walls 308, the ribs 316 are not stepped. The ribs 316 on the stepped walls 308 have a constant rib gradient from the cell base up to a chamfered upper section 309 which has a shallower gradient of 10 degrees from vertical for guiding cylindrical stabilised media into the cell.

The ribs 316 have a steeper gradient than any of the inclined side walls, and the gradient of the corner side walls 306 is less steep than the upper portion 310 or the lower portion 312 of the stepped walls 308.

In the illustrated second embodiment, the step gradient of the step 314 is 20 degrees to vertical. This angle helps to direct water inwards into the cell when the plants are watered.

The lower portion 312 of the stepped side wall has a gradient of 1.5 degrees to vertical, while the ribs 316 have a gradient of 0.25° to vertical—the steepness of the ribs 316 means that when a cylindrical stabilised medium is placed in the cell, the ribs abut the vertical sides of the cylindrical stabilised medium, and support it in an upright position. This advantageously prevents the cylindrical stabilised medium from tipping over when the tray is being moved, and ensures that the location of the cylindrical stabilised medium is as reliable as is required for automated extraction processes.

The upper portion 310 of the stepped side wall has a gradient of 1 degree to vertical. The step in the side walls and the ribs increases the relative proportion of the cell volume that is located in the upper portion of the cell compared to the lower portion of the cell.

The corner side walls 306 have a shallower, less steep, gradient than the stepped side walls 208. In the illustrated embodiment, the corner side walls 306 have a constant gradient of 3.5° from vertical. The less steep incline of the corner side walls helps to make it easier to extract loose-filled substrate root balls from the cells, as they exert less friction on the sides of the root balls as they are urged upwards.

The tray 300 comprises square vents 328 formed in the tray top between the corner side walls of adjacent cells 310. These vents allow air flow vertically through the tray, which reduces humidity in the canopy.

Four first openings 330 are positioned around the cell base, each first opening being positioned in the separation between a pair of ribs 316. Four second openings 332 are arranged around the cell base at 45 degree offsets from the first openings, such that the second openings 332 are each positioned on the corner side walls. Both the first openings 330 and the second openings 332 advantageously provide aeration to the base of the cell, as well as allowing air pruning to take place when roots grow downwards out of the openings.

The first openings 330 extend upwards from the cell base over a height of 7 mm, while the second openings 332 extend upwards from the cell base over a height of 14 mm.

Each of the first openings 330 is positioned in the gap between a pair of ribs 316, and a rib crossbar 334 extends laterally between the pair of ribs 316 above each first opening 330. The provision of the rib crossbar above the first openings advantageously helps to direct water into the centre of the cell (into the walls of the cylindrical stabilised medium for example) rather than running downwards out of the first opening 330 and missing the stabilised medium. The rib crossbar thus provides a useful water-saving feature that ensures more of the water poured over the plant-growing tray is soaked up by the substrate or stabilised media in the cells.

In the embodiment of FIGS. 4 and 5, projections 336 are formed at the base end of the corner side walls 306, the projections having a sloped upper surface 338 and a steep front face 340 in which the second openings 332 are formed. The sloped upper surface 338 acts to direct water into the centre of the cell. The steep front faces 340 are positioned at the same radius from the cell centre as the ribs 316, such that when a cylindrical stabilised medium is received in the cell, the steep front faces 340 contact the walls of the stabilised medium and help to support it in an upright central position.

The cell base 302 is formed from a plurality of base ribs defining a plurality of drainage holes. The base ribs support the base of a cylindrical stabilised medium or substrate contained in the cells, while the drainage holes allow excess water to escape. In the preferred embodiment illustrated, the drainage holes occupy 64% of the area of the cell base, which allows sufficient drainage while still providing enough support that loose-filled substrate does not fall out of the drainage holes.

The dimensions of the cells 310 may be varied to suit different plants. In a particularly preferred embodiment however the illustrated cells 310 have a cell volume of 17 cc, such that each cell 310 is capable of containing 17 cc of loose-filled substrate. The cells 310 have a depth from cell base to tray top of 46.3 mm, and the diameter of the cell base is 20 mm, such that the cells are capable of holding loose filled substrate or receiving a cylindrical stabilised medium with a diameter of 20 mm and a height of 42 mm. The ribs 316 have a gradient of 0.25 degrees from vertical for a height of 30 mm from the cell base, above which the ribs 316 are chamfered at a shallower angle of 10 degrees from vertical. The distance between the cell base and the bottom of the step in the stepped side wall is 28 mm in the preferred embodiment, and the step has a length of 3 mm.

The three cell embodiments described above may be provided in a variety of tray sizes, for example in trays having a variety of cell numbers in the array.

FIG. 6 illustrates one preferred embodiment of an injection-moulded plastic plant-growing tray 600 having 345 cells in a rectangular array of 15×23 cells. A tray skirt 610 extends around the perimeter of the tray 600. The tray skirt has a height that is equal to, or slightly greater than, the depth of the cells.

In one particularly preferred embodiment, the tray of FIG. 6 contains 345 cells of the type shown in FIGS. 4 and 5. In this embodiment, the tray size is 600 mm×400 mm, the tray skirt 610 has a height of 46.3 mm, and the spacing between adjacent cells is 26 mm measured from cell centre to cell centre. Such a tray may be used with cylindrical stabilised media, in which case it will receive 345 cylindrical stabilised media with a diameter of 20 mm and a height of 42 mm. Alternatively, such a tray may be filled with loose substrate, in which case each cell holds 17 cc of substrate.

FIG. 7 illustrates an alternative plant-growing tray 700 usable with any of the three cell embodiments described above.

FIG. 7 illustrates an injection-moulded plastic plant-growing tray 700 having 96 cells in a rectangular array of 12×8 cells. A tray skirt 710 extends around the perimeter of the tray 700. The tray skirt has a height that is equal to, or slightly greater than, the depth of the cells.

Figure 2:
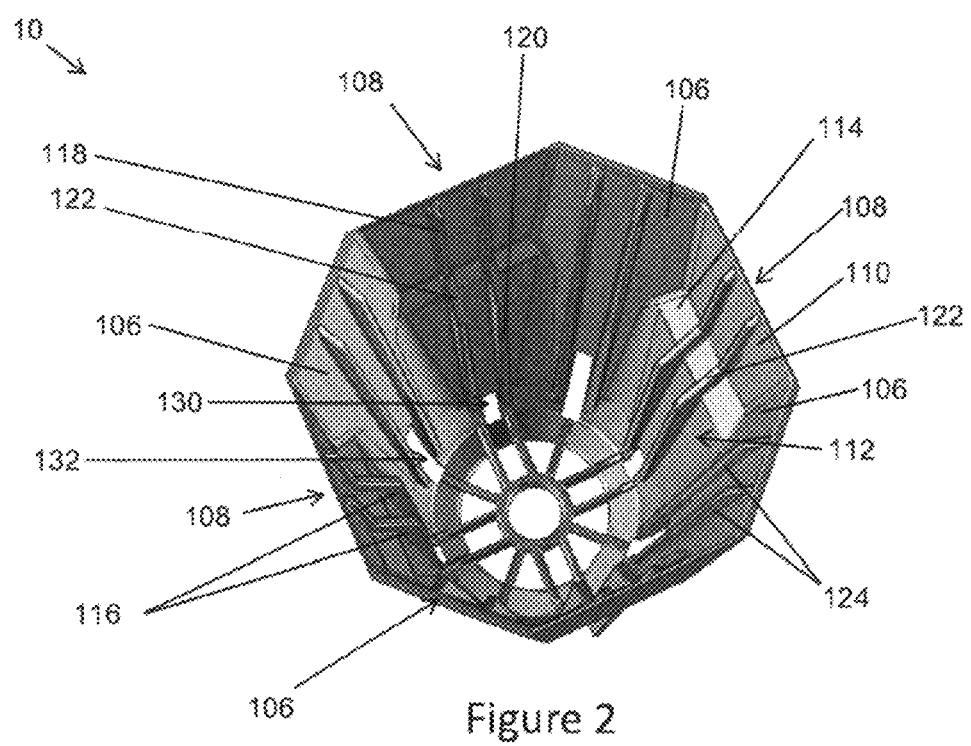
FIG. 2 is a perspective view of a single cell of the plant-growing tray of FIG. 1.

In one particularly preferred embodiment, the tray of FIG. 7 contains 96 cells of the type shown in FIGS. 1 and 2. In this embodiment, the tray size is 600 mm×400 mm, the tray skirt 710 has a height of 100 mm, and the spacing between adjacent cells is 48 mm measured from cell centre to cell centre (lengthways direction) and 46.25 mm (widthways direction). Such a tray may be used with cylindrical stabilised media, in which case it will receive 96 cylindrical stabilised medium with a diameter of 35 mm and a height of 97 mm. Alternatively, such a tray may be filled with loose substrate, in which case each cell holds 140 cc of substrate.

Figure 8:
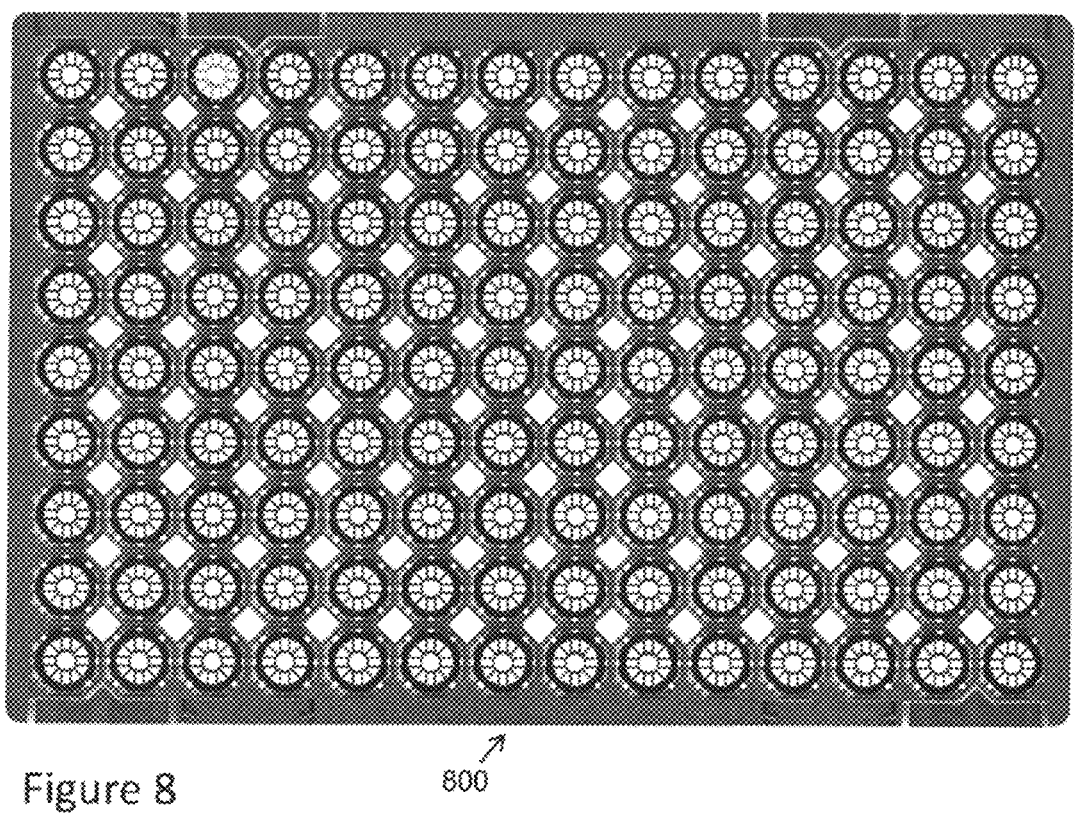
FIG. 8 is a plan view of a plant-growing tray according to another preferred embodiment of the present invention.

FIG. 8 illustrates an injection-moulded plastic plant-growing tray 800 having 126 cells in a rectangular array of 14×9 cells. In one particularly preferred embodiment, the tray of FIG. 8 contains 126 cells of the type shown in FIG. 3. In this embodiment, the tray size is 600 mm×400 mm, the tray skirt 810 has a height of 90 mm, and the spacing between adjacent cells is 41 mm measured from cell centre to cell centre. Such a tray may be used with cylindrical stabilised media, in which case it will receive 126 cylindrical stabilised medium with a diameter of 35 mm and a height of 90 mm. Alternatively, such a tray may be filled with loose substrate, in which case each cell holds 105 cc of substrate.

Figure 9:
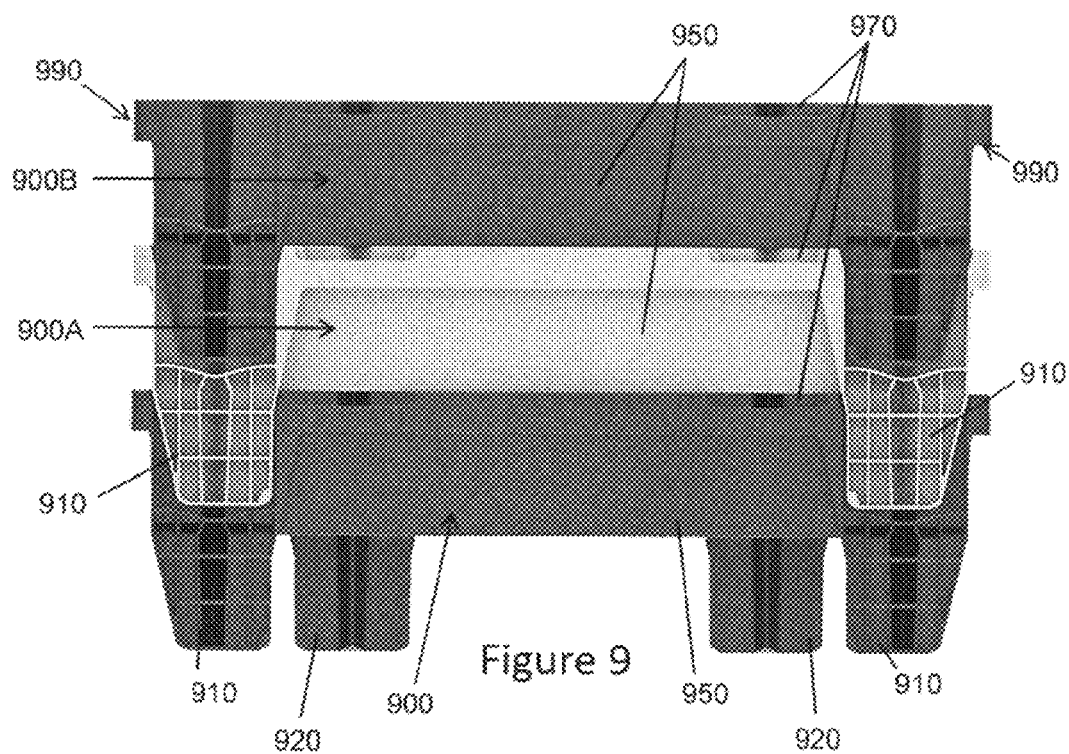
FIG. 9 is a side view of three plant trays according to a preferred embodiment of the invention, stacked in a first stacking orientation.
Figure 10:
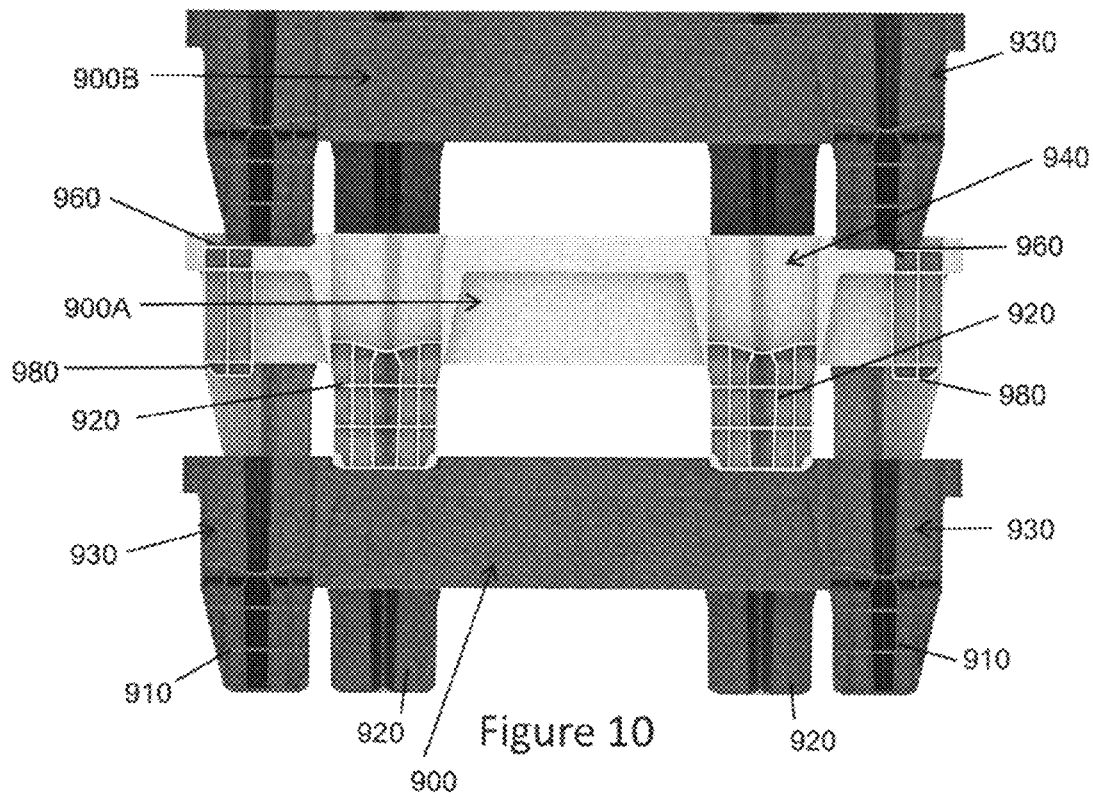
FIG. 10 is a side view of three plant trays according to a preferred embodiment of the invention, stacked in a second stacking orientation.

Both trays 700 and 800 have legs which allow the trays 700, 800 to be stacked in two different stacking orientations as illustrated in FIGS. 9 and 10.

As illustrated in FIGS. 9 & 10, a first plant-growing tray 900 comprises a pair of first legs 910, positioned on a first side of the tray and having a first separation between the first legs, and a pair of second legs 920, positioned on a second side of the tray opposite the first side and having a second separation between the second legs. The first separation and the second separation are different.

The first legs 910 comprise a recessed upper portion 930, the recessed upper portion being configured to receive the first legs 910 of an identical second plant-growing tray 900A stacked on top of the first tray 900 in a first stacking orientation illustrated with three trays 900, 900A, 900B in FIG. 9. Likewise, the second legs 920 comprise a recessed upper portion 940, the recessed upper portion 940 being configured to receive the second legs 920 of the second tray 900A stacked on top of the first tray 900 in the first stacking orientation. In the first stacking orientation, the legs of the stacked trays 900, 900A, 900B nest within one another, and the tray skirts 950 of the three trays abut one another so that the tray top of the first tray 900 is flush with the bottom of the second tray 900A and so on.

The second side of the tray top preferably comprises a pair of first recesses 960, the first recesses being separated by the first separation. The first side of the tray top preferably comprises a pair of second recesses 970, the second recesses being separated by the second separation. In a second stacking orientation illustrated in FIG. 10, the second tray 900A is rotated by 180 degrees and stacked on top of the first tray 900, so that the first legs 910 of the second tray 900A are received in the first recesses 960 of the first tray 900, and the second legs 920 of the second tray 900A are received in the second recesses 970 of the first tray.

The first and second recesses 960, 970 are significantly shallower than the height of the legs 910, 920, so in the second stacking orientation the bottom of the second tray 900A is raised above the tray top of the first tray 900 below. This creates a gap between stacked trays which allows plant stems and leaves to project up into the gap even when the trays are stacked to save space.

A variety of tray dimensions are possible, depending on the plants intended to be grown in the plant-growing trays 900, 900A, 900B. In a particularly preferred embodiment, however, the cells and the skirt 950 have a height of 100 mm, and the first and second legs 910, 920 have a height of 80 mm (the legs project downwards 80 mm beyond the bottom of the skirt 950). The recessed upper portions 930, 940 of the legs have a depth of 80 mm from the tray top, so that in the first stacking orientation the legs 910, 920 of the tray above are received entirely in the recessed upper portions of the tray below. The first and second recesses have a depth of 10 mm, so that in the second stacking orientation, the gap between the tray top and the bottom of the tray above is 70 mm. This provides sufficient space for young plants to extend above the tray top without being crushed by the tray above.

The trays 900, 900A, 900B also comprise a pair of lugs 980 on the bottom of the skirt 950 on the second side of the trays, in a position corresponding to the second recesses 970. The pair of lugs 980 project below the skirt 950 by a depth matching the depth of the first recesses 960, so when multiple trays are nested in the first stacking orientation, the lugs 980 are received in the first recesses 960. In this orientation, the lugs abut the bottom of the first recesses, which limits how tightly the stacked trays can be nested into one another. This may advantageously prevent trays from getting forced together too tightly and becoming stuck together.

In this tray design, the first and second legs advantageously support the tray off the ground to allow air movement between trays, to allow mechanical handling systems to get underneath and pick up the trays, and to eliminate the need for an expensive benching system. The tray ends also comprise a rim 990 which allows adjacent trays to be lifted on forks, and advantageously enables multiple trays to be moved simultaneously.

The invention claimed is:

1. A plant-growing tray comprising a plurality of cells, each cell for containing in use a substrate for a plant or a cylindrical stabilised medium for propagating a plant, in which each cell is formed from injection-moulded plastic and comprises a cell base and eight inclined side walls extending upwardly from the cell base,
   wherein the eight inclined side walls comprise four corner side walls having a corner wall gradient, and four stepped side walls which comprise an upper portion having an upper gradient, a lower portion having a lower gradient, and a step having a step gradient, the step being positioned between the upper portion and the lower portion, in which the step gradient is less steep than the gradients of the upper portion and the lower portion of the side wall,
   and in which each cell comprises a pair of ribs on each of the four stepped walls, the ribs extending upwards from the cell base,
   in which at least a lower portion of the ribs have a rib gradient which is steeper than the gradients of the inclined side walls, and in which the gradient of the corner side walls is less steep than the upper portion or the lower portion of the stepped walls.

2. A plant-growing tray according to claim 1, in which the step gradient is between 18 and 22 degrees to vertical, preferably in which the step gradient is 20 degrees to vertical.

3. A plant-growing tray according to claim 1, in which the steps have a length of between 3 mm and 7 mm.

4. A plant-growing tray according to claim 1, in which at least a portion of the ribs on the stepped walls have a gradient of less than 0.5 degrees from vertical.

5. A plant-growing tray according to claim 1, in which each cell comprises a pair of ribs on each corner side wall, preferably in which the ribs on the corner side walls have a rib gradient that is less steep than the ribs on the stepped walls.

6. A plant-growing tray according to claim 1, in which the lower portions of the stepped cell side walls are connected to adjacent corner side walls by curved wall portions.

7. A plant-growing tray according to claim 1, wherein each of the four stepped side walls are arranged 90 degrees apart around the cell, and the four corner side walls are arranged between the stepped side walls.

8. A plant-growing tray according to claim 1, in which the upper gradient of the stepped side walls is different from the lower gradient of the stepped side walls, preferably wherein the lower gradient is less steep than the upper gradient.

9. A plant-growing tray according to claim 1, in which the lower gradient is at least 0.5 degrees less steep than the upper gradient.

10. A plant-growing tray according to claim 1, in which the upper gradient is 1 degree or less from vertical, and the lower gradient is 1 degree or more from vertical.

11. A plant-growing tray according to claim 1, in which the angle of the corner walls to vertical is at least three times greater than the angle to vertical of the upper portion of the stepped walls.

12. A plant-growing tray according to claim 1, in which each of the stepped side walls comprises a first opening extending upwards from the cell base, and in which each cell comprises a plurality of second openings arranged on the corner side walls, in which the first openings extend upwards from the cell base over a first opening height, and in which the second openings extend upwards from the cell base over a second opening height, wherein the second opening height is at least two times greater than the first opening height.

13. A plant-growing tray according to claim 12, in which the openings are positioned between rib pairs, and in which the width of each opening is equal to the separation between a pair of ribs, and/or in which each of the first openings is positioned in the gap between a pair of ribs, and in which a rib crossbar extends laterally between the pair of ribs above the first opening.

14. A plant-growing tray according to claim 1, in which the step meets the lower portion of the side wall at a height of at least 50% of the cell height.

15. A plant-growing tray according to claim 1, in which each cell comprises drainage holes in the cell base, and in which the drainage holes occupy between 60% and 70% of the area of the cell base.

16. A plant-growing tray according to claim 1, wherein the pair of ribs of each of the stepped walls extend inwards into the cell, and in which the ribs on the stepped walls comprise an upper rib portion having an upper rib gradient, a lower rib portion having a lower rib gradient, and a rib step having a rib step gradient, the rib step being positioned between the upper rib portion and the lower rib portion, in which the rib step gradient is less steep than the upper rib gradient and the lower rib gradient.

17. A plant-growing tray according to claim 16, in which the rib step has a rib step gradient of between 15 and 25 degrees to vertical, preferably between 18 and 22 degrees to vertical, particularly preferably 20 degrees to vertical.

18. A plant-growing tray according to claim 1, in which the rib step gradient is the same as the step gradient of the stepped side walls, and/or in which the lower rib gradient is steeper than the upper rib gradient and the rib step gradient, and/or in which the upper rib gradient is the same as the upper gradient of the stepped side wall.

19. A plant-growing tray according to claim 16, in which the lower rib gradient is steeper than the lower gradient of the stepped side wall, preferably in which the lower rib gradient is less than 0.5 degrees to vertical.

20. A plant-growing tray according to any preceding claim 1, in which the tray comprises an array of 96 cells, or 126 cells, or 345 cells.

* * * * *